United States Patent
Tomiyama et al.

[11] Patent Number: 6,053,953
[45] Date of Patent: Apr. 25, 2000

[54] NONAQUEOUS SECONDARY BATTERY AND PROCESS FOR PREPARATION THEREOF

[75] Inventors: Hideki Tomiyama; Hiroshi Fujimoto; Hajime Miyamoto, all of Miyagi, Japan

[73] Assignees: Fuji Photo film Co., Ltd., Kanagawa; Fujifilm Celltec Co., Ltd., Miyagi, both of Japan

[21] Appl. No.: 09/018,336

[22] Filed: Feb. 4, 1998

[30] Foreign Application Priority Data

Feb. 14, 1997 [JP] Japan .................................. 9-030734

[51] Int. Cl.[7] .......................... H01M 6/00; H01M 10/44
[52] U.S. Cl. .................................. 29/623.1; 429/231.95; 429/322; 320/21
[58] Field of Search ........................ 429/48, 50, 231.4, 429/231.95, 322; 320/21; 29/623.1

[56] References Cited

U.S. PATENT DOCUMENTS

| | | | |
|---|---|---|---|
| 5,442,274 | 8/1995 | Tamai | 320/23 |
| 5,556,721 | 9/1996 | Sasaki et al. | 429/218 |
| 5,654,622 | 8/1997 | Toya et al. | 320/21 |
| 5,780,181 | 7/1998 | Idota et al. | 429/194 |
| 5,888,670 | 3/1999 | Kawakami | 429/231.4 |

FOREIGN PATENT DOCUMENTS

96/41394  12/1996  WIPO .......................... H01M 10/50

*Primary Examiner*—Maria Nuzzolillo
*Assistant Examiner*—Raymond Alejandro
*Attorney, Agent, or Firm*—Sughrue, Mion, Zinn, Macpeak & Seas, PLLC

[57] ABSTRACT

A nonaqueous secondary battery is disclosed, comprising a positive electrode sheet containing a lithium-containing transition metal oxide as a positive electrode active material, a negative electrode sheet having at least one layer containing a negative electrode material capable of intercalating and deintercalating lithium, and a nonaqueous electrolyte containing a lithium metal salt, wherein the battery into which an electrolytic solution has been injected is sealed, subjected to charging treatment having at least two stages, and subjected to storage treatment having at least two steps. A process for preparing such the nonaqueous secondary battery is also disclosed.

2 Claims, 1 Drawing Sheet

FIGURE 1

NONAQUEOUS SECONDARY BATTERY AND PROCESS FOR PREPARATION THEREOF

FIELD OF THE INVENTION

The present invention relates to a nonaqueous secondary battery having improved charge-discharge cycle characteristics.

BACKGROUND OF THE INVENTION

In recent years, a high capacity secondary battery, particularly a nonaqueous secondary battery utilizing the intercalation/deintercalation reaction of lithium ion, as an electric source for electronic apparatus such as portable telephone, video camera and note type personal computer has been in growing demand. Referring particularly to nonaqueous secondary batteries for the portable telephone, those having high capacity as well as good repeatability in use, i.e., good charge-discharge cycle characteristics have been desired.

In general, the secondary batteries are prepared by a process which comprises winding an element, inserting a wound element into a battery can, injecting an electrolyte into the can, sealing the can, and then ageing the element. These secondary batteries thus prepared are then examined for properties before shipping.

The ageing is normally effected for two weeks to a month, mostly at ordinary temperature. The ageing provides an effect of stabilizing the battery properties.

The inventors made extensive studies of ageing of secondary batteries. As a result, it was found that the charge-discharge capacity and cycle characteristics of the secondary batteries can be improved with ageing of the secondary batteries in which they are subjected to charging treatment having at least two two stages and storage treatment having at leat two times.

SUMMARY OF THE INVENTION

Therefore, an object of the present invention is to provide a nonaqueous secondary battery having improved charge-discharge cycle characteristics.

The foregoing object of the present invention will become more apparent from the following detailed description and examples.

The foregoing object of the present invention is accomplished by the following nonaqueous secondary battery of the present invention and the following process for preparing the nonaqueous secondary battery.

(1) A nonaqueous secondary battery comprising a positive electrode sheet containing a lithium-containing transition metal oxide as a positive electrode active material, a negative electrode sheet having at least one layer containing a negative electrode material capable of intercalating and deintercalating lithium, and a nonaqueous electrolyte containing a lithium metal salt, wherein the battery into which an electrolytic solution has been injected is sealed, subjected to charging treatment having at least two stage, and subjected to storage treatment having at least two steps.

(2) The nonaqueous secondary battery as in the above item (1), wherein the charging treatment having at least two stages comprises a charging treatment stage which is carried out at an open-circuit voltage of from 1.5 V to less than 3.8 V, and a charging treatment stage which is carried out at an open-circuit voltage of from 3.8 V to 4.3 V.

(3) The nonaqueous secondary battery as in the above item (1), wherein the storage treatment having at least two steps comprises a storage treatment step which is carried out in an atmosphere of from 20° C. to 70° C. for from 1 day to 30 days, and a storage treatment step which is carried out in an atmosphere of from 40° C. to 80° C. for 1 hour to 30 days.

(4) The nonaqueous secondary battery as in the above item (1), wherein the battery into which an electrolytic solution has been injected is sealed, subjected to charging treatment at an open-circuit voltage of from 1.5 V to less than 3.8 V and then subjected to storage treatment in an atmosphere of from 20° C. to 70° C. for from 1 day to 30 days; and then the treated battery is further subjected to charging treatment at an open-circuit voltage of from 3.8 V to 4.3 V and then subjected to storage treatment in an atmosphere of from 40° C. to 80° C. for 1 hour to 30 days.

(5) The nonaqueous secondary battery as in any one of the above items (1) to (4), wherein the negative electrode material is a metal or semi-metal oxide.

(6) The nonaqueous secondary battery as in any one of the above items (1) to (5), wherein the negative electrode sheet comprises at least one auxiliary layer containing a solid fine particle which doesn't substantially intercalate and deintercalate lithium.

(7) The nonaqueous secondary battery as in the above item (1), wherein a metallic material mainly comprising lithium is laminated on the negative electrode sheet comprising at least one layer containing a negative electrode material capable of intercalating and deintercalating lithium provided on a current collector and an auxiliary layer provided thereon.

(8) The nonaqueous secondary battery as in the above item (1), wherein lithium has been previously incorporated into the negative electrode material by the charging treatment and storage treatment.

(9) The nonaqueous secondary battery as in the above items (1), wherein the positive electrode sheet contains at least one lithium-containing transition metal composite oxide as a positive electrode active material.

(10) The nonaqueous secondary battery as in above item (5), wherein the layer mainly containing a metal or semi-metal oxide as a negative electrode material comprises at least one oxide of metal or semi-metal elements belonging to the groups XIII to XV in the periodic table.

(11) The nonaqueous secondary battery as in the above item (5), wherein the negative electrode material is a composite oxide represented by formula (1):

$$SnM^1_aO_t \quad (1)$$

wherein $M^1$ represents two or more elements selected from the group consisting of Al, B, P, Si, Ge, elements belonging to the groups I to III in the periodic table, and halogen elements; a represents a number of from 0.2 to 2; and t represents a number of from 1 to 6.

(12) The nonaqueous secondary battery as in the above item (5), wherein the composite oxide containing tin is a composite oxide represented by formula (4):

$$SnM^3_cM^4_dO_t \quad (4)$$

wherein $M^3$ represents at least one selected from the group consisting of Al, B, P, Ge and Si; $M^4$ represents at least one selected from the group consisting of elements belonging to the groups I to III in the periodic table and halogen elements; c represents a number of from 0.2 to 2; d represents a number of from 0.01 to 1, with the proviso that c and d satisfy the relationship 0.2<c+d<2; and t represents a number of from 1 to 6.

(13) A process for preparing a nonaqueous secondary battery comprising a positive electrode sheet containing a lithium-containing transition metal oxide as a positive electrode active material, a negative electrode sheet having at least one layer containing a negative electrode material capable of intercalating and deintercalating lithium, and a nonaqueous electrolyte containing a lithium metal salt, wherein the battery into which an electrolytic solution has been injected is sealed, subjected to charging treatment having at least two stages, and subjected to storage treatment having at least two steps.

(14) A process for preparing a nonaqueous secondary battery comprising a positive electrode sheet containing a lithium-containing transition metal oxide as a positive electrode active material, a negative electrode sheet having a metallic material mainly comprising lithium laminated on at least one layer containing a negative electrode material capable of intercalating and deintercalating lithium having thereon at least one auxiliary layer containing an electrically-conductive particle, and a nonaqueous electrolyte containing a lithium metal salt, wherein the battery into which an electrolytic solution has been injected is sealed, subjected to charging treatment at an open-circuit voltage of from 1.5 V to less than 3.8 V and then subjected to storage treatment in an atmosphere of from 20° C. to 70° C. for from 1 day to 30 days; and then the treated battery is further subjected to charging treatment at an open-circuit voltage of from 3.8 V to 4.3 V and then subjected to storage treatment in an atmosphere of from 40° C. to 80° C. for 1 hour to 30 days.

BRIEF DESCRIPTION OF THE DRAWING

By way of example and to make the description more clear, reference is made to the accompanying drawing in which.

DETAILED DESCRIPTION OF THE INVENTION

The present invention will be further described in detail hereinafter.

In the present invention, secondary batteries which have been sealed are charged, and then allowed to stand for a predetermined period of time. In general, secondary batteries are charged and discharged over several cycles before shipping to confirm their capacity. However, this practice differs from the constitution of the present invention involving sealing, charging, and storage over a predetermined period of time in purpose of the present invention. Examples of preferred steps of the present invention up to shipping include a step of sealing, charging and storing over a predetermined period of time according to the present invention, a step of examining for short-circuiting, and a step of checking capacity involving several cycles of charging and discharging. The charging and storage according to the present invention are preferably effected under the following conditions.

Hereinafter, both the charging treatment (i.e., the step of charging) which is carried out after the step of sealing and the storage treatment (i.e., the step of storage) are generally called the ageing in the present invention.

In the ageing according to the present invention, at least two stages of the charging treatment (e.g., the first and second charging treatments) are carried out.

The first charging treatment is preferably carried out at the open-circuit voltage of preferably from 1.5 V to less than 3.8 V, more preferably from 1.5 V to 3.5 V, and most preferably from 1.8 V to 3.2 V.

The adjusting of the open-circuit voltage of the battery can be accomplished by charging or discharging the battery which has an electrolytic solution injected therein and then cramped. The battery comprising a negative electrode sheet in which a metallic material mainly containing lithium is laminated therein, described herein as an embodiment of the present invention, undergoes battery reaction when the electrolytic solution comes in contact with the negative electrode sheet. Accordingly, the open-circuit voltage of such the battery can be adjusted by the amount of the metallic material to be laminated.

The first chaging or charging/discharging is carried out preferably between immediately after the beginning of ageing (i.e., immediately after cramping) and 7 days, and particularly preferably between immediately after the beginning of ageing and 2 days.

The ageing temperature between the cramping and the first charging treatment is preferably from 0° C. to 40° C., more preferably from 2° C. to 30° C. and most preferably from 5° C. to 25° C.

Now, it is preferable that the ageing temperature before the first charging treatment is lower than that after the first charging treatment.

Also, it is preferable in the present invention that the ageing is carried out between the first charging treatment and the second charging treatment.

The ageing after the first charging treatment is carried out under the condition of an ageing temperature of preferably from 20° C. to 70° C., more preferably from 25° C. to 65° C. and most preferably from 30° C. to 60° C. and an ageing duration (i.e., period of time) of preferably from 1 day to 30 days and more preferably from 2 days to 25 days.

The second charging treatment is preferably carried out at the open-circuit voltage of preferably from 3.8 V to 4.3 V and more preferably from 3.9 V to 4.1 V.

The ageing after the second charging treatment is carried out under the condition of an ageing temperature of preferably from 40° C. to 80° C. and more preferably from 50 V to 70 V and an ageing duration (i.e., period of time) of preferably from 1 hour to 30 days and more preferably from 1 hour to 7 days.

When the open-circuit voltage of the battery is adjusted by charging, the battery is preferably charged until the prescribed voltage at a constant current and then charged at a constant voltage so as to obtain difference between the charging voltage and the open-circuit voltage of 1.0 V or less.

The charging condition at the above constant current is preferably from 0.05 mA to 4.5 mA, more preferably from 0.1 mA to 3.0 mA and most preferably from 0.15 mA to 2.4 mA, per 1 $cm^2$ of one side of the electrode sheet.

The duration (i.e., period of time) of charging is preferably from 0.2 to 20 hours, more preferably from 0.5 to 10 hours and most preferably from 0.5 to 5 hours.

The number of charging-discharging cycles is preferably from 1 to 500, more preferably from 5 to 200 and most preferably from 10 to 150.

Also, if the open-circuit voltage of the battery is adjusted by charging/discharging, it may be terminated by either charging or discharging.

The temperature at which the foregoing charging or charging/discharging operation is effected, is preferably from 0° C. to 60° C., more preferably from 10° C. to 50° C. and most preferably from 20° C. to 40° C.

The charging or chgarging/discharging operation may be effected over several times and particularly preferably 2 or 3 times during the ageing, thought the operation comprising two stages of the firat and second stages is explained above.

In the charging or charging/discharging operation, the open-circuit voltage is preferably from 1.5 V to 4.3 V.

During the ageing, the battery may be positioned vertically or horizontally and further may be continuously rotated and vibrated.

The ageing duration (i.e., period of time) is preferably within 60 days and more preferably within 10 days, from after the sealing.

The negative electrode sheet of the present invention preferably comprises a metallic material mainly composed of lithium laminated therein.

As the metallic material mainly composed of lithium a lithium metal is preferably used. The lithium metal preferably has a purity of not less than 90% by weight, more preferably not less than 98% by weight. The lamination of lithium on the negative electrode sheet preferably extends all over the surface of the sheet. Since lithium which has been previously incorporated into the negative electrode material gradually diffuses into the negative electrode material during ageing, lithium may be partially laminated on the surface of the sheet in the form of stripe, frame or disc instead of on the entire surface of the sheet. The term "lamination" as used herein means that a metallic foil mainly composed of lithium is directly pressed to a sheet having negative electrode material mixture and an auxiliary layers.

The positive electrode and the negative electrode to be incorporated in the nonaqueous secondary battery of the present invention can be prepared by applying a positive electrode material mixture and a negative electrode material mixture to a current collector. The positive electrode and negative electrode may comprise a protective layer besides the material mixture layer containing a positive electrode active material and a negative electrode material, respectively, for the purpose of mechanically or chemically protecting the material mixture layer.

The auxiliary layer (e.g., protective layer) to be provided on the surface of the electrode will be further described hereinafter.

In the present invention, the auxiliary layer to be provided in the negative electrode sheet comprises at least one layer. The plurality of auxiliary layers constituting the same or different layer may be provided. The foregoing auxiliary layer comprises a water-insoluble electrically-conductive particle and a binder. As the binder there may be used a binder for use in the formation of an electrode material mixture described later. The proportion of the electrically-conductive particle to be incorporated in the auxiliary layer is preferably from 2.5% by weight to 96% by weight, more preferably from 5% by weight to 95% by weight, particularly preferably from 10% by weight to 93% by weight.

Examples of the water-insoluble electrically-conductive particle used herein include metal, metal oxide, metallic fiber, carbon fiber, and carbon particle such as carbon black and graphite. The water-solubility of the water-insoluble electrically-conductive particle is not more than 100 ppm, preferably none (i.e., water-insoluble). Preferred among these water-insoluble electrically-conductive particles is a solid fine particle having a low reactivity with alkaline metals, particularly lithium, which doesn't substantially intercalate and deintercalate lithium, preferably metal powder or carbon particle. The electrical resistivity of the element constituting the foregoing particle (i.e., particulate material) at 20° C. is preferably not higher than $5 \times 10^9 \Omega \cdot m$.

As the metal powder there is preferably used a metal having a low reactivity with lithium, i.e., metal which can difficultly form a lithium alloy. Specific preferred examples of such the metal include copper, nickel, iron, chromium, molybdenum, titanium, tungsten, and tantalum. Such the metal powder may be in any form such as acicular shape, column, tabular shape and mass. The maximum diameter of the metal powder is preferably from 0.02 $\mu$m to 20 $\mu$m, more preferably 0.1 $\mu$m to 10 $\mu$m. The foregoing metal powder is preferably not excessively oxidized. If oxidized, it is preferably subjected to heat treatment in a reducing atmosphere.

As the carbon particle there may be used a well-known carbon material which has conventionally been used as an electrically-conductive material in the case where the active electrode material is not electrically conductive. Examples of the well-known carbon material include carbon black such as thermal black, furnace black, channel black and lamp black, natural graphite such as flake graphite, scaly graphite and earthy graphite, artificial graphite, and carbon fiber. In order to disperse the foregoing carbon particle in the binder, it is preferred that carbon black and graphite be used in combination. Preferred examples of the carbon black include acetylene black, and ketjen black. The diameter of the carbon particle is preferably from 0.01 $\mu$m to 20 $\mu$m, more preferably 0.02 $\mu$m to 10 $\mu$m.

The foregoing auxiliary layer may comprise a substantially non-conductive particle incorporated therein for the purpose of enhancing the strength of the coating film or like purposes. Examples of such the particle include teflon fine particle, SiC, aluminum nitride, alumina, zirconia, magnesia, mullite, forsterite and steatite. The foregoing particle is preferably used in an amount of from 0.01 times to 10 times that of the electrically-conductive particle.

If the negative electrode is formed by applying a material mixture on the both sides of the current collector, the foregoing auxiliary layer may be applied to either one or both sides of the negative electrode.

In a method for applying the auxiliary layer, a successive process may be employed which comprises applying a material mixture mainly composed of a metal or semi-metal oxide capable of reversibly intercalating or deintercalating lithium to the current collector, and then applying an auxiliary layer to the material mixture layer. Alternatively, a simultaneous coating process may be employed which comprises simultaneously applying the material mixture layer and the auxiliary layer.

The positive electrode sheet to be combined with the negative electrode sheet, too, may comprise a protective layer incorporated therein. In this case, the protective layer comprises at least one layer. The plurality of protective layers constituting the same or different layer may be provided. The foregoing protective layer may be a layer substantially having no electronic conductivity, i.e., insulating layer or may be the same electrically-conductive layer as in the negative electrode sheet. Alternatively, the protective layer may be a laminate of an insulating layer and an electrically-conductive layer. The thickness of the protective layer is preferably from 1 $\mu$m to 40 $\mu$m, more preferably 2 $\mu$m to 30 $\mu$m. The particulate material constituting the foregoing protective layer preferably doesn't melt or form a new film at temperatures of not higher than 300° C.

If the protective layer is made of a water-insoluble electrically-conductive particle and a binder, the electrically-conductive particle may be the same as incorporated in the auxiliary layer in the negative electrode sheet. The kind and size of the electrically-conductive particle which can be preferably used herein are the same as in the case of negative electrode sheet.

If the protective layer is insulating, it preferably comprises an organic or inorganic particle incorporated therein. The size of the foregoing particle is preferably from 0.1 $\mu$m to 20 $\mu$m, more preferably from 0.2 $\mu$m to 15 $\mu$m. A preferred example of the organic particle is a crosslinked latex or fluororesin in powder form which doesn't melt or form a film at temperatures of not higher than 300° C. More preferably, a teflon fine particle may be used.

Specific examples of the inorganic particle used herein include particulate metal, and particulate carbide, silicide, nitride, sulfide and oxide of nonmetallic element.

Among these carbides, silicides and nitrides of nonmetallic element, SiC, aluminum nitride (AlN), BN and BP are desirable because they exhibit a high insulation resistance and a high chemical stability. In particular, SiC obtained with BeO, Be or BN as a sintering aid is desirable.

Among chalcogenides, oxides are preferably desirable. Oxides which can difficultly be oxidized or reduced are desirable. Specific examples of these oxides include $Al_2O_3$, $As_4O_6$, $B_2O_3$, BaO, BeO, CaO, $Li_2O$, $K_2O$, $Na_2O$, $In_2O_3$, MgO, $Sb_2O_5$, $SiO_2$, SrO, and $ZrO_4$. Particularly preferred among these oxides are $Al_2O_3$, BaO, BeO, CaO, $K_2O$, $Na_2O$, MgO, $SiO_2$, SrO, and $ZrO_4$. These oxides may be in single form or composite form. Preferred examples of compounds which can be used as the composite oxide include mullite ($3Al_2O_3.2SiO_2$), steatite ($MgO.SiO_2$), forsterite ($2MgO.SiO_2$), and cordierite ($2MgO.2Al_2O_3.5SiO_2$).

These insulating inorganic particulate compounds may be produced under properly controlled conditions or may be ground after produced to have a grain size of from 0.1 $\mu$m to 20 $\mu$m, particularly from 0.2 $\mu$m to 15 $\mu$m before use.

The protective layer is formed by using the foregoing electrically-conductive particle and/or particle substantially having no electrical conductivity and a binder. As the binder there may be used a binder used in the formation of an electrode material mixture described later. Referring to the ratio of the particle to binder, the proportion of the particle is preferably from 40% by weight to 96% by weight, more preferably from 50% by weight to 94% by weight based on the sum of the weight of the two components (i.e., the particle and binder).

As the active positive electrode material which can be used herein there may be used any compound capable of intercalating or deintercalating a light metal ion. In particular, it may be selected from the group consisting of transition metal oxides and transition metal chalcogenides. Transition metal oxides are particularly preferred. In particular, lithium-containing transition metal oxides are preferred.

Preferred examples of transition metal which can be used herein include Ti, V, Cr, Mn, Fe, Co, Ni, Cu, Nb, Mo, and W. Preferred among these transition metal compounds are manganese dioxide, vanadium pentaoxide, iron oxide, molybdenum oxide, molybdenum sulfide, cobalt oxide, iron sulfide, and titanium sulfide. These compounds may be used singly. Alternatively, two or more of these compounds may be used in combination. These compounds may be used in the form of transition metal oxide containing lithium.

The lithium compound or transition metal oxide may be normally calcined in admixture with a compound which enhances ionic conductivity such as $Ca^{2+}$ or an amorphous network forming agent containing P, B or Si (e.g., $P_2O_5$, $Li_3PO_4$, $H_3BO_3$, $B_2O_3$, $SiO_2$). Alternatively, the lithium compound or transition metal oxide may be normally calcined in admixture with an alkaline metal ion such as Na ion, K ion and Mg ion and/or a compound containing Si, Sn, Al, Ga, Ge, Ce, In, Bi, etc. The transition metal oxide containing lithium can be synthesized by calcining a mixture of a lithium compound and a transition metal compound.

Specific examples of preferred positive electrode active material which can be used herein are described in JP-A-61-5262 (The term "JP-A" as used herein means an "unexamined published Japanese patent application"), U.S. Pat. No. 4,302,518, JP-A-63-299056, JP-A-1-294364, JP-B-4-30146 (The term "JP-B" as used herein means an "examined Japanese patent publication"), U.S. Pat. No. 5,240,794, U.S. Pat. No. 5,153,081, JP-A-4-328,258, and JP-A-5-54,889. Representative examples of positive electrode active materials will be given below, but the present invention should not be construed as being limited thereto.

$Li_xCoO_2$, $Li_xNiO_2$, $Li_xCo_aNi_{1-a}O_2$, $Li_xCo_bV_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$, $Li_xMn_bFe_{1-b}O_z$, $Li_xCo_cB_{1-c}O_2$ (in which x=0.05 to 1.2, a=0.1 to 0.9, b=0.8 to 0.98, c=0.85 to 0.99, z=1.5 to 5)

The positive electrode active material to be used herein can be synthesized by calcining or solution-reacting a lithium compound and a transition metal compound in admixture. The calcining process is particularly preferred.

The details of the calcining process are described in JP-A-6-60867 and JP-A-7-14579. These processes can be used. The positive electrode active material obtained by calcining may be washed with water, an acidic aqueous solution, an alkaline aqueous solution or an organic solvent before use.

The chemical incorporation of lithium ion into the transition metal oxide may be accomplished by reaction of lithium metal, lithium alloy or butyl lithium with a transition metal oxide.

The average particle size of the positive active material to be used herein is preferably from 0.1 to 50 $\mu$m. The percent volume of particles having a particle diameter of from 0.5 to 30 $\mu$m is preferably not less than 95%. More preferably, the percent volume of particles having a particle diameter of not more than 3 $\mu$m and particles having a particle diameter of from 15 $\mu$m to 25 $\mu$m are not more than 18%, respectively. The specific surface area of the positive electrode active material is not specifically limited. In practice, however, it is preferably from 0.01 to 50 $m^2/g$, particularly from 0.2 to 1 $m^2/g$. The pH value of a supernatant liquid of a solution of 5 g of the positive electrode active material dissolved in 100 ml of distilled water is preferably from 7 to 12.

If the positive electrode active material is obtained by calcining, the calcining temperature is preferably from 500° C. to 1,500° C., more preferably from 700° C. to 1,200° C., particularly preferably from 750° C. to 1,000° C. The calcining time is preferably from 4 to 30 hours, more preferably from 6 to 20 hours, particularly preferably from 6 hours to 15 hours.

As the negative electrode material which can be used herein there may be used a compound capable of intercalating or deintercalating a light metal ion. In particular, light metal, light metal alloy, carbon-based compound, inorganic oxide, inorganic chalcogenide, metal complex, and organic high molecular compound are desirable. These compounds may be used singly or in combination. Examples of such the combination include combination of light metal and carbonaceous compound, combination of light metal and inorganic oxide, and combination of light metal, carbonaceous compound and inorganic oxide. These negative electrode materials can advantageously provide high capacity, high discharge voltage, high safety and excellent cycle characteristics.

As the light metal there is preferably used lithium. Examples of the light metal alloy which can be used herein include an alloy containing lithium or a metal capable of forming an alloy with lithium. Al, Al—Mn, Al—Mg, Al—Sn, Al—In, and Al—Cd are particularly desirable.

The carbonaceous compound which can be used herein may be selected from the group consisting of natural graphite, artificial graphite, gas phase-grown carbon, and carbon obtained by calcining organic material. Such the carbonaceous compound preferably has a graphite structure. The carbonaceous compound may contain foreign compounds such as B, P, N, S, SiC, $B_4C$ in an amount of from 0 to 10% by weight besides carbon.

The element constituting the oxide or chalcogenide is preferably a transition metal or a metal or semi-metal element belonging to the groups XIII to XV in the periodic table.

The transition metal compound is preferably a single or composite oxide or chalcogenide, of V, Ti, Fe, Mn, Co, Ni, Zn, W and Mo. A more desirable transition metal compound is $Li_pCo_qV_{1-q}O_z$ (in which p=0.1 to 2.5, q=0 to 1, and z=1.3 to 4.5) described in JP-A-6-44,972.

As the compound of metal or semi-metal other than transition metal there may be selected a single or composite oxide or chalcogenide, of elements belonging to the groups XIII to XV in the periodic table such as Al, Ga, Si, Sn, Ge, Pb, Sb, and Bi.

Preferred examples of these compounds include $Al_2O_3$, $Ga_2O_3$, SiO, $SiO_2$, GeO, $GeO_2$, SnO, $SnO_2$, $SnSiO_3$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O_5$, $SnSiO_3$, GeS, $GeS_2$, SnS, $SnS_2$, PbS, $PbS_2$, $Sb_2S_3$, $Sb_2S_5$, and $SnSiS_3$. These compounds may be in the form of composite oxide with lithium oxide, e.g., $Li_2GeO_3$ and $Li_2SnO_2$.

The foregoing composite chalcogen compound or composite oxide is preferably almost amorphous when assembled into a battery. The term "almost amorphous" as used herein means a material which exhibits a broad scattering zone having a peak in terms of a 2θ value of 20° to 40° as analyzed by X-ray diffractometry using CuKα ray. This material may exhibit a crystalline diffraction line. Preferably, the intensity of the strongest crystalline diffraction line observed at from 40° C. to 70° C. in terms of a 2θ value is not more than 500 times, more preferably not more than 100 times, particularly not more than 5 times that of the peak diffraction line in the broad scattering zone observed at from 20° C. to 40° C. in terms of a 2θ value. Most preferably, this material exhibits no crystalline diffraction line.

The foregoing composite chalcogen compound or composite oxide is a composite compound of transition metals or elements belonging to the groups XIII to XV in the periodic table. A composite chalcogen compound or composite oxide mainly composed of two or more elements selected from the group consisting of B, Al, Ga, In, Tl, Si, Ge, Sn, Pb, P, As, Sb, and Bi is more desirable. The composite oxide is more desirable.

Particularly preferred among the foregoing composite oxides is a composite oxide mainly composed of two or more elements selected from the group consisting of B, Al, Si, Ge, Sn and P.

These composite chalcogen compounds or composite oxides may contain elements belonging to the groups I to III in the periodic table or halogen elements to modify mainly the amorphous structure. Further, these composite chalcogen compounds or composite oxides may contain a transition metal.

Preferred among the foregoing negative electrode materials is an amorphous composite oxide mainly composed of tin. This composite oxide is represented by formula (1) or (2):

$$SnM^1_aO_t \qquad (1)$$

wherein $M^1$ represents two or more elements selected from the group consisting of Al, B, P, Si, Ge, elements belonging to the groups I to III in the periodic table, and halogen elements; a represents a number of from 0.2 to 2; and t represents a number of from 1 to 6.

$$Sn_xT_{1-x}M^1_aO_t \qquad (2)$$

wherein T represents at least one transition metal selected from the group consisting of V, Ti, Fe, Mn, Co, Ni, Zn, W and Mo; x represents a number of from 0.1 to 0.9; and $M^1$, A and t are the same meaning as in formula (1).

Preferred among compounds represented by formula (1) is a compound represented by formula (3):

$$SnM^2_bO_t \qquad (3)$$

wherein $M^2$ represents two or more elements selected from the group consisting of Al, B, P, Ge, elements belonging to the groups I to III in the periodic table, and halogen element; b represents a number of from 0.2 to 2; and t represents a number of from 1 to 6.

More preferred among compounds represented by formula (3) is a compound represented by formula (4):

$$SnM^3_cM^4_dO_t \qquad (4)$$

wherein $M^3$ represents at least one selected from the group consisting of Al, B, P, Ge and Si; $M^4$ represents at least one selected from the group consisting of elements belonging to the groups I to III in the periodic table, and halogen element; c represents a number of from 0.2 to 2; d represents a number of from 0.01 to 1, with the proviso that c and d satisfy the relationship 0.2<c+d<2; and t represents a number of from 1 to 6.

The preparation of the amorphous composite oxide of the present invention can be accomplished by either calcining process or solution process, preferably calcining process. In the calcining process, oxides or compounds represented by formula (1) are preferably mixed thoroughly before calcining to obtain the desired amorphous composite oxide.

Referring to the calcining conditions, the heating rate is preferably from 5° C. to 200° C. per minute, the calcining temperature is preferably from 500° C. to 1,500° C., and the calcining time is preferably from 1 hour to 100 hours. The cooling rate is preferably from 2° C. to $10^{7°}$ C. per minute.

The term "heating rate" as used herein means the average rate of heating from 50% of the calcining temperature (° C.) to 80% of the calcining temperature (° C.). The term "cooling rate" as used herein means the average rate of cooling from 80% of the calcining temperature (° C.) to 50% of the calcining temperature (° C.).

The cooling may be effected in the calcining furnace. Alternatively, the product thus calcined may be taken out from the calcining furnace, and then put into, e.g., water so that it is cooled. Further, ultra-rapid cooling processes such as gun process, Hammer-Anvil process, slap process, gas atomize process, plasma spray process, centrifugal rapid cooling process and melt drag process described in "Ceramics Processing", Gihodo Shuppan, page 217 may be used. Moreover, single roller process and double roller process described in "New Glass Handbook", Maruzen, 1991, page 172 may be used. When the material to be calcined melts during calcining, the calcined product may be continuously taken out while the starting material is being supplied. The melt of such the material is preferably stirred during calcining.

The calcining gas atmosphere is preferably one having an oxygen content of not more than 5 vol-%, more preferably an inert gas atmosphere. Examples of the inert gas include nitrogen, argon, helium, krypton, and xenon. The most desirable inert gas is pure argon.

The average particle size of the compound of the present invention is preferably from 0.1 to 60 $\mu$m. In some detail, the average particle diameter of the compound is preferably from 0.7 to 25 $\mu$m, and the particles having a particle diameter of from 0.5 to 30 $\mu$m preferably occupy not less than 60% of the total volume of the particulate compound. Referring to the negative electrode active material of the present invention, the particles having a particle diameter of not more than 1 $\mu$m preferably occupy not more than 30% of the total volume of the particulate compound, and the particles having a particle diameter of not less than 20 $\mu$m preferably occupy not more than 25% of the total volume of the particulate compound. It goes without saying that the particle diameter of the material to be used herein does not exceed the thickness of the material mixture layer on one side of the negative electrode.

The adjustment of the particle size of the material to a predetermined value can be accomplished by means of a well-known grinder or classifier. Examples of such the machine include mortar, ball mill, sand mill, oscillating ball mill, satellite ball mill, planetary ball mill, pivoted air stream jet mill, and sieve. If necessary, grinding can be accomplished by wet grinding in the presence of water or an organic solvent such as methanol. In order to adjust the particle diameter of the material to a predetermined value, classification is preferably effected. The classification process is not specifically limited. In practice, sieve, air classifying machine, etc. may be used as necessary. Classification may be effected in dry or wet processes.

The term "average particle diameter" as used herein means the median diameter of primary particles. It can be measured by means of a laser diffraction type particle size distribution meter.

Specific examples of the negative electrode material of the present invention are given below, but the present invention should not be construed as being limited thereto.

$SnAl_{0.4}B_{0.5}P_{0.5}K_{0.1}O_{3.65}$,
$SnAl_{0.4}B_{0.5}P_{0.5}Na_{0.2}O_{3.7}$,
$SnAl_{0.4}B_{0.3}P_{0.5}Rb_{0.2}O_{3.4}$,
$SnAl_{0.4}B_{0.5}P_{0.5}K_{0.1}Ge_{0.05}O_{3.85}$,
$SnAl_{0.4}B_{0.5}P_{0.5}K_{0.1}Mg_{0.1}Ge_{0.02}O_{3.83}$,
$SnAl_{0.4}B_{0.5}P_{0.4}O_{3.2}$,
$SnAl_{0.3}B_{0.5}P_{0.2}O_{2.7}$,
$SnAl_{0.3}B_{0.5}P_{0.2}O_{2.7}$,
$SnAl_{0.4}B_{0.5}P_{0.3}Ba_{0.08}Mg_{0.08}O_{3.26}$,
$SnAl_{0.4}B_{0.4}P_{0.4}Ba_{0.08}O_{3.28}$,
$SnAl_{0.4}B_{0.5}P_{0.5}O_{3.6}$,
$SnAl_{0.4}B_{0.5}P_{0.5}Mg_{0.1}O_{3.7}$,
$SnAl_{0.5}B_{0.4}P_{0.5}Mg_{0.1}F_{0.2}O_{3.65}$,
$SnB_{0.5}P_{0.5}Li_{0.1}Mg_{0.1}F_{0.2}O_{3.05}$,
$SnB_{0.5}P_{0.5}K_{0.1}Mg_{0.1}F_{0.2}O_{3.05}$,
$SnB_{0.5}P_{0.5}K_{0.05}Mg_{0.05}F_{0.1}O_{3.03}$,
$SnB_{0.5}P_{0.5}K_{0.05}Mg_{0.05}F_{0.2}O_{3.03}$,
$SnAl_{0.4}B_{0.5}P_{0.5}Cs_{0.1}Mg_{0.1}F_{0.2}O_{3.65}$,
$SnB_{0.5}P_{0.5}Cs_{0.5}Mg_{0.05}F_{0.1}O_{3.03}$,
$SnB_{0.5}P_{0.5}Mg_{0.1}F_{0.1}O_{3.05}$,
$SnB_{0.5}P_{0.5}Mg_{0.1}F_{0.2}O_{3}$,
$SnB_{0.5}P_{0.5}Mg_{0.1}F_{0.06}O_{3.07}$,
$SnB_{0.5}P_{0.5}Mg_{0.1}F_{0.14}O_{3.03}$,
$SnPBa_{0.08}O_{3.58}$,
$SnPK_{0.1}O_{3.55}$,
$SnPK_{0.05}Mg_{0.05}O_{3.58}$,
$SnPCs_{0.1}O_{3.55}$,
$SnPBa_{0.08}F_{0.08}O_{3.54}$,
$SnPK_{0.1}Mg_{0.1}F_{0.2}O_{3.55}$,
$SnPK_{0.05}Mg_{0.05}F_{0.1}O_{3.53}$,
$SnPCs_{0.1}Mg_{0.1}F_{0.2}O_{3.55}$,
$SnPCs_{0.05}Mg_{0.05}F_{0.1}O_{3.53}$,
$Sn_{1.1}Al_{0.4}B_{0.2}P_{0.6}Ba_{0.08}F_{0.08}O_{3.54}$,
$Sn_{1.1}Al_{0.4}B_{0.2}P_{0.6}Li_{0.1}K_{0.1}Ba_{0.1}F_{0.1}O_{3.65}$,
$Sn_{1.1}Al_{0.4}B_{0.4}P_{0.4}Ba_{0.08}O_{3.34}$,
$Sn_{1.1}Al_{0.4}PCs_{0.05}O_{4.23}$,
$Sn_{1.1}Al_{0.4}PK_{0.05}O_{4.23}$,
$Sn_{1.2}Al_{0.5}B_{0.3}P_{0.4}Cs_{0.2}O_{3.5}$,
$Sn_{1.2}Al_{0.4}B_{0.2}P_{0.6}Ba_{0.08}O_{3.68}$,
$Sn_{1.2}Al_{0.4}B_{0.2}P_{0.6}Ba_{0.08}Fe_{0.08}O_{3.64}$,
$Sn_{1.2}Al_{0.4}B_{0.2}P_{0.6}Mg_{0.04}Ba_{0.04}O_{3.68}$,
$Sn_{1.2}Al_{0.4}B_{0.3}P_{0.5}Ba_{0.08}O_{3.58}$,
$Sn_{1.3}Al_{0.3}B_{0.3}P_{0.4}Na_{0.2}O_{3.3}$,
$Sn_{1.3}Al_{0.2}B_{0.4}P_{0.4}Ca_{0.2}O_{3.4}$,
$Sn_{1.3}Al_{0.4}B_{0.4}P_{0.4}Ba_{0.2}O_{3.6}$,
$Sn_{1.4}Al_{0.4}PK_{0.2}O_{4.6}$,
$Sn_{1.4}Al_{0.2}Ba_{0.1}PK_{0.2}O_{4.45}$,
$Sn_{1.4}Al_{0.2}Ba_{0.2}PK_{0.2}O_{4.6}$,
$Sn_{1.4}Al_{0.4}Ba0.2PK_{0.2}Ba_{0.1}F_{0.2}O_{4.9}$,
$Sn_{1.4}Al_{0.4}PK_{0.3}O_{4.65}$,
$Sn_{1.5}Al_{0.2}PK_{0.2}O_{4.4}$,
$Sn_{1.5}Al_{0.4}PK_{0.1}O_{4.65}$,
$Sn_{1.5}Al_{0.4}PCs_{0.05}O_{4.63}$,
$Sn_{1.5}Al_{0.4}PCs_{0.05}Mg_{0.1}F_{0.2}O_{4.63}$,
$SnSi_{0.5}Al_{0.1}B_{0.2}P_{0.1}Ca_{0.4}O_{3.1}$,
$SnSi_{0.4}Al_{0.2}B_{0.4}O_{2.7}$,
$SnSi_{0.5}Al_{0.2}B_{0.1}P_{0.1}Mg_{0.1}O_{2.8}$,
$SnSi_{0.6}Al_{0.2}B_{0.2}O_{2.8}$,
$SnSi_{0.5}Al_{0.3}B_{0.4}P_{0.2}O_{3.55}$,
$SnSi_{0.5}Al_{0.3}B_{0.4}P_{0.5}O_{4.30}$,
$SnSi_{0.6}Al_{0.1}B_{0.1}P_{0.3}O_{3.25}$,
$SnSi_{0.6}Al_{0.1}B_{0.1}P_{0.1}Ba_{0.2}O_{2.95}$,
$SnSi_{0.6}Al_{0.1}B_{0.1}P_{0.1}Ca_{0.2}O_{2.95}$,
$SnSi_{0.6}Al_{0.4}B_{0.2}Mg_{0.1}O_{3.2}$,
$SnSi_{0.6}Al_{0.1}B_{0.3}P_{0.1}O_{3.05}$,
$SnSi_{0.6}Al_{0.2}Mg_{0.2}O_{2.7}$,
$SnSi_{0.6}Al_{0.2}Ca_{0.2}O_{2.7}$,
$SnSi_{0.6}Al_{0.2}P_{0.2}O_{3}$,
$SnSi_{0.6}B_{0.2}P_{0.2}O_{3}$,
$SnSi_{0.8}Al_{0.2}O_{2.9}$,
$SnSi_{0.8}Al_{0.3}B_{0.2}P_{0.2}O_{3.85}$,
$SnSi_{0.8}B_{0.2}O_{2.9}$, $SnSi_{0.8}Ba_{0.2}O_{2.8}$,
$SnSi_{0.8}Mg_{0.2}O_{2.8}$,
$SnSi_{0.8}Ca_{0.2}O_{2.8}$,
$SnSi_{0.8}P_{0.2}O_{3.1}$,
$Sn_{0.9}Mn_{0.3}B_{0.4}P_{0.4}Ca_{0.1}Rb_{0.1}O_{2.95}$,
$Sn_{0.9}Fe_{0.3}B_{0.4}P_{0.4}Ca_{0.1}Rb_{0.1}O_{2.95}$,
$Sn_{0.8}Pb_{0.2}Ca_{0.1}P_{0.9}O_{3.35}$,
$Sn_{0.3}Ge_{0.7}Ba_{0.1}P_{0.9}O_{3.35}$,
$Sn_{0.9}Mn_{0.1}Mg_{0.1}P_{0.9}O_{3.35}$,
$Sn_{0.2}Mn_{0.8}Mg_{0.1}P_{0.9}O_{3.35}$,
$Sn_{0.7}Pb_{0.3}Ca_{0.1}P_{0.9}O_{3.35}$,
$Sn_{0.2}Ge_{0.8}Ba_{0.1}P_{0.9}O_{3.35}$.

The chemical formula of the compound obtained by calcining can be calculated by a measuring method such as an induction coupled plasma (ICP) emission spectroscopic analysis. Alternatively, it can be calculated by a simple method, i.e., from the difference in powder weight between before and after calcining.

The amount of the light metal to be intercalated into the negative electrode material of the present invention may be approximated to the deposition potential of the light metal. For example, it is preferably from 50 to 700 mol-%, particularly preferably from 100 to 600 mol-% based on the negative electrode material. The amount of the light metal to be deintercalated is preferably as much as possible with respect to the amount of the light metal to be intercalated. The intercalation of the light metal is preferably accomplished by an electrochemical, chemical or thermal process. The electrochemical process preferably involves electrochemical intercalation of light metal contained in the positive electrode active material into the negative electrode material or electrochemical intercalation of light metal into the negative electrode material directly from light metal or its alloy. The chemical process involves mixing or contact of the negative electrode material with light metal or reaction of the negative electrode material with an organic metal such as butyllithium. The foregoing electrochemical or chemical processes are desirable. A particularly preferred example of the light metal is lithium or lithium ion.

The negative electrode material of the present invention may comprise various elements incorporated therein. Examples of these elements include dopants of lanthanoid metals (e.g., Hf, Ta, W, Re, Os, Ir, Pt, Au, Hg) and various compounds which enhance electronic conductivity (e.g., Sb, In Nb compounds). The amount of such the compound to be added is preferably from 0 to 5 mol-%.

The surface of the oxides to be used herein as a positive electrode active material or negative electrode material may be coated with an oxide having a chemical formula different from that of the positive electrode active material or negative electrode material used. The surface oxide preferably contains a compound soluble in both an acidic and alkaline solution. Further, a metal oxide having a high electronic conductivity is desirable. Examples of such the metal oxide include $PbO_2$, $Fe_2O_3$, $SnO_2$, $In_2O_3$, and ZnO. These oxides may comprise dopants (e.g., metal or halogen element having a valency different from that of these metals in the form of oxide) incorporated therein. Particularly preferred among these metal oxides are $SiO_2$, $SnO_2$, $Fe_2O_3$, ZnO, and $PbO_2$.

The amount of the metal oxide thus surface-treated is preferably from 0.1 to 10% by weight, particularly preferably from 0.2 to 5% by weight, most preferably from 0.3 to 3% by weight based on the weight of the positive electrode active material or negative electrode material.

Further, the surface of the positive electrode active material or negative electrode material may be modified. In some detail, the surface of the metal oxide may be treated with an esterification agent, a chelating agent, an electrically-conductive high molecular compound, a polyethylene oxide or the like.

Further, the surface of the negative electrode material may be modified. For example, an ionically-conductive polymer or polyacetylene layer may be provided on the surface of the negative electrode material. The positive electrode active material and negative electrode material may be subjected to purification with rinsing, etc.

As the electrode material mixture there may be used a conductive agent, a binder, a filler, a dispersant, an ionically conductive agent, a pressure intensifier or other various additives.

As the conductive agent there may be used any electrically-conductive material which undergoes no chemical reaction in the battery thus assembled. Examples of such an electrically-conductive material include graphites such as natural graphite (e.g., flake graphite, scaly graphite, earthy graphite) and artificial graphite, carbon blacks such as acetylene black, ketjen black, channel black, furnace black, lamp black and thermal black; electrically-conductive fibers such as carbon fiber and metallic fiber; metallic powders such as copper, nickel, aluminum and silver powder; electrically-conductive whiskers such as zinc oxide and potassium titanate; electrically-conductive metal oxides such as titanium oxide; and organic electrically-conductive materials such as polyphenylene derivative. The electrode material mixture may comprise these electronically-conductive materials incorporated therein singly or in admixture. Particularly preferred among these electrically conductive agents are acetylene black and graphite to be used in combination with acetylene black. In order to prepare a water-dispersible electrode material mixture, an electrically conductive agent which has previously been dispersed in water is preferably used.

The amount of the electrically conductive agent to be added is not specifically limited. In practice, however, it is preferably from 1 to 50% by weight, particularly preferably from 1 to 30% by weight. If carbon or graphite is used, it is particularly preferably from 2 to 15% by weight.

Examples of the binder to be incorporated in the electrode material mixture layer and the layer containing no active material include polysaccharides, thermoplastic resins, and polymers having rubber elasticity. These compounds may be used singly or in admixture. Preferred examples of these compounds include starch, polyvinyl alcohol, carboxymethyl cellulose, hydroxypropyl cellulose, regenerated cellulose, diacetyl cellulose, polyvinyl chloride, polyvinyl pyrrolidone, polytetrafluoroethylene, polyvinylidene fluoride, polyethylene, polypropylene, ethylene-propylene-diene terpolymer (EPDM), sulfonated EPDM, styrene butadiene rubber, polybutadiene, fluororubber, and polyethylene oxide. If a compound containing a functional group which reacts with lithium, such as polysaccharide is used, a compound such as isocyanate group is preferably added to deactivate the functional group. The amount of the binder to be added is not specifically limited. In practice, however, it is preferably from 1 to 50% by weight, particularly preferably from 2 to 30% by weight. The distribution of the binder in the electrode material mixture may be uniform or ununiform. A preferred example of the binder which can be used herein is a polymer having a decomposition temperature of not lower than 300° C. Specific examples of such the polymer include polyethylene, polypropylene, polytetrafluoroethylene (PTFE), polyvinylidene fluoride (PVDF), tetrafluoroethylene-hexafluoropropylene copolymer (FEP), tetrafluoroethylene-perfluoroalkylvinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethylvinyl ether-tetrafluoroethylene copolymer.

As the filler there may be used any fibrous material which undergoes no chemical reaction in the battery thus assembled. In general, fibers of olefinic polymer such as polypropylene and polyethylene, glass, carbon, etc. may be used. The amount of the filler to be added is not specifically limited. In practice, however, it is preferably from 0 to 30% by weight.

As the ionically conductive agent there may be used a material known as an inorganic or organic solid electrolyte. For the details of such a material, reference can be made to the description of electrolytic solution given later. The pressure intensifier is a compound described later which increases the internal pressure. A representative example of such the compound is carbonate.

The electrolyte normally comprises a solvent, and a lithium salt (anion and lithium cation) dissolved in the solvent. Examples of the solvent include aprotic organic solvents such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, ethyl monoglyme, triester phosphate, trimethoxymethane, dioxolane derivative, sulfolane, 3-methyl-2-oxazolidinone, propylene carbonate derivative, tetrahydrofuran derivative, ethyl ether and 1,3-propane sultone. These solvents may be used singly or in admixture. Examples of lithium salt cations soluble in these solvents include $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}Cl_{10}^-$, (1,2-dimethoxyethane)$_2ClO_4^-$, lower aliphatic carboxylic acid ion, $AlCl_4^-$, $Cl^-$, $Br^-$, $I^-$, anion of chloroborane compound, and tetraphenylboric acid ion. These cations may be used singly or in combination. The solvent preferably contains a cyclic carbonate and/or non-cyclic carbonate. For example, diethyl carbonate, dimethyl carbonate or methyl ethyl carbonate is preferably contained in the solvent. An electrolyte comprising $LiCF_3SO_3$, $LiClO_4$, $LiBF_4$ and/or $LiPF_6$ incorporated in an electrolytic solution obtained by properly mixing ethylene carbonate with propylene carbonate, 1,2-dimethoxyethane, dimethyl carbonate or diethyl carbonate is desirable. Particularly preferred among these supporting electrolytes is $LiPF_6$.

The amount of such the electrolyte to be incorporated in the battery is not specifically limited. In practice, however, a required amount of such the electrolyte can be used depending on the amount of the positive electrode active material or negative electrode material or the size of the battery.

The concentration of the supporting electrolyte is not specifically limited. In practice, however, it is preferably from 0.2 to 3 mols per l of electrolytic solution.

Besides the foregoing electrolytic solution, the following solid electrolytes can be used as well.

Solid electrolytes can be divided into two groups, i.e., inorganic solid electrolyte and organic solid electrolyte.

As inorganic solid electrolytes there have been well known lithium nitrides, halides, oxyacid salts, etc. Particularly effective among these inorganic solid electrolytes are $Li_3N$, $LiI$, $Li_5NI_2$, $Li_3N$—$LiI$—$LiOH$, $Li_4SiO_4$, $Li_4SiO_4$—$LiI$—$LiOH$, $xLi_3PO_4$-$(1-x)Li_4SiO_4$, $Li_2SiS_3$, and phosphorus sulfide compound.

As the organic solid electrolyte there may be effectively used a polyethylene oxide derivative or a polymer containing the polyethylene oxide derivative, a polypropylene oxide derivative or a polymer containing the polypropylene oxide derivative, a polymer containing an ion dissociating group, a mixture of the polymer containing an ion dissociating group and the foregoing aprotic electrolytic solution, an ester phosphate polymer or a high molecular matrix material containing an aprotic polar solvent. A polyacrylonitrile may be added to the electrolytic solution. Alternatively, an inorganic solid electrolyte and an organic solid electrolyte may be used in combination.

For the purpose of improving the discharge or charge-discharge characteristics of the battery, other compounds may be incorporated in the electrolyte. Examples of these compounds include pyridine, triethyl phosphite, triethanolamine, cyclic ether, ethylenediamine, n-glyme, triamide hexaphosphate, nitrobenzene derivative, sulfur, quinoneimine dye, N-substituted oxazolidinone and N,N'-substituted imidazolidinone, ethylene glycol dialkyl ether, quaternary ammonium salt, polyethylene glycol, pyrrole, 2-methoxyethanol, $AlCl_3$, monomer of electrically-conductive polymer electrode active material, triethylenephosphoramide, trialkyl phosphine, morpholine, aryl compound containing carbonyl group, crown ether such as 12-crown-4, hexamethyl phosphoric triamide and 4-alkylmorpholine, bicyclic tertiary amine, oil, quaternary phosphonium salt, and tertiary sulfonium salt.

The electrolyte may comprise a halogen-containing solvent such as carbon tetrachloride and ethylene chloride trifluoride incorporated therein to render itself incombustible. Further, the electrolyte may comprise carbon dioxide gas incorporated therein to adapt itself to storage at high temperatures.

The positive and negative electrode material mixture may comprise an electrolytic solution or electrolyte incorporated therein. A well-known approach involves the incorporation of the foregoing ionically-conductive polymer, nitromethane or electrolytic solution into these compounds.

As the separator to be assembled into the battery there may be used an insulating microporous thin film having a great ion permeability and a predetermined mechanical strength. The separator to be used herein preferably blocks off its pores at a temperature of not lower than 80° C. to raise its resistivity. From the standpoint of organic solvent resistance and hydrophobicity, a sheet or nonwoven fabric made of an olefinic polymer such as polypropylene and/or polyethylene or glass fiber may be used. The diameter of the pores in the separator falls within the range used in ordinary battery separators, e.g., from 0.01 to 10 μm. The thickness of the separator falls within the range used in ordinary battery separators, e.g., from 5 to 300 μm. In order to prepare the separator, a polymer which has been synthesized may be subjected to dry process, stretching process, solution removal process or solvent removal process, singly or in combination, to form pores therein.

As the current collector for positive electrode there is preferably used the aluminum foil previously mentioned. The collector may have an electrically-conductive film containing an electrically-conductive particle such as carbon black, graphite and metal powder on the surface thereof.

As the current collector for negative electrode there may be used any electronic conductor which undergoes no chemical reaction in the battery thus assembled. For example, stainless steel, nickel, copper, titanium, aluminum, carbon, etc. may be used. Besides these materials, copper or stainless steel surface-treated with carbon, nickel, titanium or silver or Al—Cd alloy may be used. Copper or copper alloy is particularly desirable.

The surface of these materials may be oxidized. Further, these materials are preferably subjected to surface treatment to roughen the surface of the current collector. The current collector may be in the form of foil. Alternatively, the current collector may be in the form of film, sheet or net. Further, the current collector may be in punched form. Moreover, the current collector may be in the form of lath, porous material, foamed material or fiber. The thickness of the current collector is not specifically limited. In practice, however, it may fall within the range of from 1 to 500 $\mu$m.

The battery thus assembled may be in sheet, cylindrical, flat or rectangular form.

In most cases, the mixture of the positive electrode active material or negative electrode material is applied to the current collector on which it is then dried and compressed. The application of the electrode material mixture can be accomplished by any ordinary method such as reverse-roll coating method, direct roll coating method, blade coating method, knife coating method, extrusion coating method, curtain coating method, gravure coating method, bar coating method, dip coating method and squeeze coating method. The coating is preferably effected at a rate of from 0.1 to 100 m/min. The foregoing coating methods can be properly selected depending on the physical properties and dryability of the material mixture to provide the resulting coating layer with good surface conditions. The coating may be effected sequentially from one surface to the other or may be effected simultaneously on both surfaces of the substrate. The coating may be effected either continuously or intermittently. Alternatively, the coating may be effected in a striped pattern. The thickness, length and width of the coating layer are determined by the size of the battery. In practice, however, the thickness of the coating layer on one surface of the substrate is preferably from 1 to 2,000 $\mu$m in the dried compressed form.

The drying or dehydration of the sheet can be accomplished by any commonly used method. In particular, hot air, vacuum, infrared rays, far infrared rays, electron rays and low humidity air can be used singly or in combination. The drying or dehydration temperature is preferably from 80° C. to 350° C., particularly preferably from 100° C. to 250° C. From the standpoint of cycle characteristics, the water content in the entire battery is preferably not more than 2,000 ppm, and the water content in the positive electrode material mixture, the negative electrode material mixture and the electrolyte are each preferably not more than 500 ppm.

The pressing of the sheet can be accomplished by any commonly used method. In particular, mold pressing or caldendering is desirable. The pressure is not specifically limited. In practice, however, it is preferably from 0.2 to 3 t/cm$^2$. The calendering rate is preferably from 0.1 to 50 m/min. The pressing temperature is preferably from room temperature to 200° C. The ratio of the width of the negative electrode sheet to that of the positive electrode sheet is preferably from 0.9 to 1.1, particularly preferably from 0.95 to 1.0. The ratio of the content of the negative electrode material to that of the positive electrode active material depends on the kind or formulation of the material mixture and thus cannot be defined. In practice, however, it can be predetermined to an optimum value taking into account the capacity, cycle characteristics and safety.

The foregoing material mixture sheets are superimposed on each other with the separator interposed therebetween. The laminate thus prepared is then wound or folded. The element thus formed is then inserted into a can. The can and the sheet are electrically connected to each other. An electrolytic solution is then injected into the can. The can is then sealed with a sealing plate to form a can battery. An explosion-proof valve can be provided as the sealing plate. The sealing plate may be further provided with various known safety elements besides the explosion-proof valve. For example, fuse, bimetal, PTC element, etc. may be used as an overcurrent preventive element. Instead of using such the explosion-proof valve as a countermeasure against rise in the internal pressure of the battery can, the battery can may be notched. Alternatively, the gasket or sealing plate may be arranged such that it is cracked when the internal pressure of the battery can is raised. Further, the battery element may be arranged such that it is disconnected from the lead plate when the internal pressure of the battery can is raised. Moreover, the charger may be internally or externally equipped with a protective circuit for preventing overcharge or overdischarge. As a countermeasure against overcharge, a mechanism may be provided for blocking current passage when the internal pressure of the battery is raised. For such the mechanism, a material for raising the internal pressure of the battery may be incorporated in the electrode material mixture or electrolyte. Examples of the compound for raising the internal pressure of the battery include carbonates such as $Li_2CO_3$, $LiHCO_3$, $Na_2CO_3$, $NaHCO_3$, $CaCO_3$ and $MgCO_3$.

The can and lead plate may be made of an electrically-conductive metal or alloy. Examples of the metal or alloy include metals such as iron, nickel, titanium, chromium, molybdenum, copper and aluminum, and alloy thereof. The welding of the cap, can, sheet and lead plate can be accomplished by any well-known method (e.g., D.C. or A.C. electric welding, laser welding, ultrasonic welding). As a sealant for sealing the battery can there may be used a well-known compound such as asphalt or mixture thereof.

The purpose of the nonaqueous secondary battery of the present invention is not specifically limited. For example, the nonaqueous secondary battery can be mounted in electronic apparatus such as color note personal computer, black-and-white note personal computer, sub-note personal computer, pen touch personal computer, pocket (palm top) personal computer, note word processor, pocket word processor, electronic book player, portable telephone, cordless phone slave receiver, pager, handy terminal, portable facsimile, portable duplicating machine, portable printer, head phone stereo, video movie, liquid crystal television, handy cleaner, portable CD, mini disc, electric shaver, electronic translating machine, automobile telephone, transceiver, electric tool, electronic note, electronic calculator, memory card, tape recorder, radio and backup electric power. Further, the nonaqueous secondary battery can be applied to consumer products such as automobile, electric vehicle, motor, lighting fixture, toy, game machine, road conditioner, electric iron, watch, strobe, camera and medical apparatus (e.g., pace maker, hearing aid, massager). Moreover, the nonaqueous secondary battery of the present invention can be applied for various military use or cosmic use. The nonaqueous secondary battery of the present invention may be combined with other secondary batteries, solar batteries or primary batteries.

For a preferred combination of the present invention, the foregoing chemical materials and battery constituents are preferably combined. In particular, the positive electrode active material comprises at least one compound selected from the group consisting of $Li_xCoO_2$, $Li_xNiO_2$, $Li_xMnO_2$ and $Li_xMn_2O_4$ (in which x is a number of from 0.05 to 1.2) incorporated therein. It further comprises acetylene black incorporated therein as an electrically conductive agent. The positive electrode current collector is in the form of net, sheet, foil or lath made of stainless steel or aluminum. As the negative electrode material there is preferably used at least one compound selected from the group consisting of lithium metal, lithium alloy (Li—Al), carbonaceous compound, oxide ($LiCoVO_4$, $SnO_2$, $SnO$, $SiO$, $GeO_2$, $GeO$, $SnSiO_3$, $SnSi_{0.3}Al_{0.1}B_{0.2}P_{0.3}O_{3.2}$), and sulfide ($TiS_2$, $SnS_2$, $SnS$, $GeS_2$, $GeS$). The negative electrode current collector is in the form of net, sheet, foil or lath made of stainless steel or copper. The electrode material mixture to be used with the positive electrode active material or negative electrode material may be mixed with a carbon material such as acetylene black and graphite as an electronically conductive agent. As the binder there may be used a fluorine-containing thermoplastic compound such as polyvinylidene fluoride and polyfluoroethylene, polymer containing acrylic acid, styrene butadiene rubber and elastomer such as ethylene propylene terpolymer, singly or in admixture. The electrolytic solution preferably contains a combination of a cyclic or noncyclic carbonate such as ethylene carbonate, diethyl carbonate and dimethyl carbonate and an ester compound such as ethyl acetate, $LiPF_6$ as a supporting electrolyte, and a lithium salt such as $LiBF_4$ and $LiCF_3SO_3$ in admixture. The separator is preferably made of polypropylene and polyethylene, singly or in combination. The battery may be in cylinder, flat or rectangular form. The battery is preferably equipped with a means for securing safety against wrong-operation (e.g., internal pressure-releasing safety valve, current-blocking safety valve, separator for raising resistivity at high temperatures).

EXAMPLE

The present invention will be further described in the following examples, but the present invention should not be construed as being limited thereto.

Example 1

86 parts by weight of $SnB_{0.2}P_{0.5}K_{0.1}Mg_{0.1}Ge_{0.1}O_{2.8}$ as an negative electrode active material and 3 parts by weight of acetylene black and 6 parts by weight of graphite as electrically conductive agent were mixed. To the mixture were then added 4 parts by weight of a polyvinylidene fluoride and 1 part by weight of carboxymethyl cellulose as binders. The mixture was then kneaded with water as a medium to obtain a negative electrode material mixture slurry.

Subsequently, 79 parts by weight of α-alumina, 18 parts by weight of graphite and 3 parts by weight of carboxymethyl cellulose were mixed to obtain an auxiliary layer slurry.

The negative electrode material mixture slurry and the auxiliary layer slurry were then applied to a 10 μm thick-copper foil on both sides thereof as a lower layer and an upper layer, respectively, by means of an extrusion coating machine. The coated material mixture was dried, and then compression-molded by means of a calender presser to obtain a belt-like negative electrode sheet (2) having a thickness of 110 μm, a width of 55 mm and a length of 520 mm.

87 parts by weight of $LiCoO_2$ as a positive electrode active material and 3 parts by weight of acetylene black and 6 parts by weight of graphite as electrically conductive agent were mixed. To the mixture were then added 3 parts by weight of Nipol 820B (manufactured by Nippon Zeon Co., Ltd.) and 1 part by weight of carboxymethyl cellulose as binders. The mixture was then kneaded with water as a medium to obtain a positive electrode material mixture slurry. The slurry thus obtained was then applied to an aluminum foil on both sides thereof by means of an extrusion coating machine. The coated material mixture was dried, and then compression-molded by means of a calender presser to obtain a belt-like positive electrode sheet (1) having a thickness of 190 μm, a width of 53 mm and a length of 445 mm.

A nickel lead plate and an aluminum lead plate were welded to the end of the foregoing negative electrode sheet (2) and positive electrode sheet (1), respectively. These sheets were then subjected to heat treatment at a temperature of 230° C. in a dried air having a dew point of not higher than −40° C. for 1 hour. The heat treatment was effected by means of a far infrared ray heater. Lithium foils (purity: 99.8%) having a thickness of 35 μm which each had been cut into a size of 4 mm×55 mm were applied to the entire surface of the negative electrode sheet thus heat-treated orthogonal to the length of the sheet at intervals of 10 mm.

The positive electrode sheet (1) which had been heat-treated, a microporous polyethylene/polypropylene film separator (3), the negative electrode sheet (2) which had been heat-treated and a separator (3) were then laminated in this order. The laminate thus prepared was then spirally wound.

Figure 1:
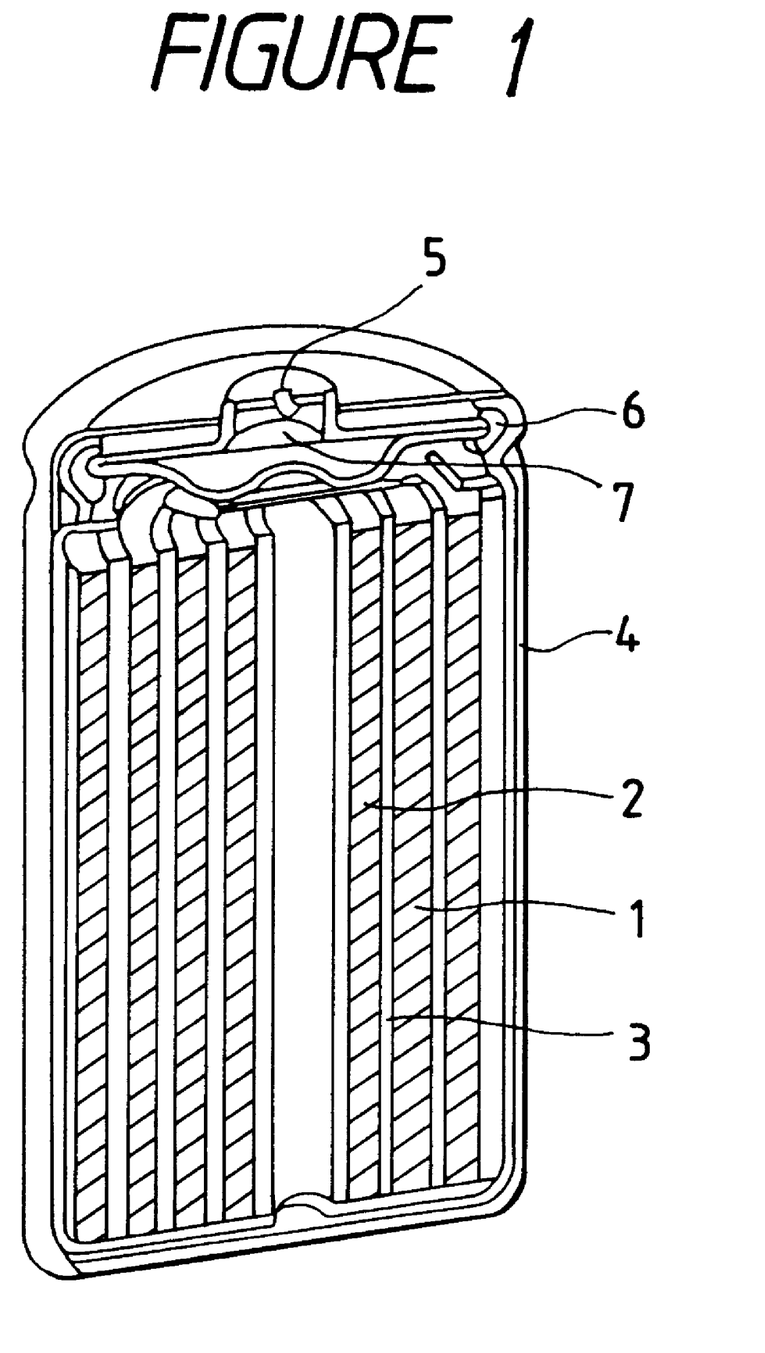
FIG. 1 is a vertical sectional view of an ordinary cylindrical battery, wherein the reference numeral 1 indicates a positive electrode, the reference numeral 2 indicates a negative electrode, the reference numeral 3 indicates a separator, the reference numeral 4 indicates a battery can, the reference numeral 5 indicates a battery lid, the reference numeral 6 indicates a gasket, and the reference numeral 7 indicates an explosion-proof valve.

The element thus wound was then inserted in a closed-end cylindrical nickel-plated iron battery can (4) which also serves as a negative electrode terminal. $LiPF_6$ and $LiBF_4$ were then injected into the battery can in an amount of 0.95 mol and 0.05 mol, respectively, per l of a 2:5:3-mixture (by weight) of ethylene carbonate, diethyl carbonate and dimethyl carbonate. The open end of the battery can was then cramped by a battery lid (5) having a positive electrode terminal using a gasket (6) provided interposed therebetween to prepare a cylindrical battery having a height of 65 mm and an outer diameter of 18 mm as shown in FIG. 1. The positive electrode terminal (5), the positive electrode sheet (1) and the battery can (4) had previously been connected to the negative electrode sheet via a lead terminal. The reference numeral (7) indicates an explosion-proof valve. 50 battery samples were prepared for each positive electrode current collector.

The battery samples thus prepared were each then charged at a constant current of 0.2 A for 30 minutes. The open-circuit voltage of these batteries was from 3.2 V to 3.3 V. Thereafter, these batteries were each aged at a 50° C.-constant temperature bath for 2 weeks. After the termination of storage, the batteries were each charged to 4.1 V at a constant current of 0.6 A (CCCV). Thereafter, the batteries were each discharged to 2.8 V at a constant current of 0.6 A so that they were activated. Thereafter, the batteries were each CCCV-charged to voltages shown in Table 1 at a constant current of 1.2 A, and then stored under the conditions (temperature and duration) shown in Table 1. After the termination of storage, the batteries were each discharged to 2.8 V, charged to 4.1 V at a constant current of 1.2 A, and then discharged to 2.8 V at a constant current of 1.2 A. Thus, the batteries were subjected to charge-discharge cycle test. The ratio of the capacity of the battery after 500 cycles to the initial capacity of the battery (charge-discharg cycle characteristics) is shown in Table 1.

TABLE 1

| No. | Charged voltage [V] | Storage temperature [° C.] | Storage time | Charge-discharge cycle characteristics [%] |
|---|---|---|---|---|
| 1 | 3.8 | 60 | 30 days | 81 |
| 2 | 3.9 | 60 | 10 days | 83 |
| 3 | 4.0 | 60 | 7 days | 84 |
| 4 | 4.1 | 60 | 3 days | 90 |
| 5 | 4.1 | 60 | 1 day | 88 |
| 6 | 4.1 | 40 | 10 days | 85 |
| 7 | 4.1 | 80 | 1 hr. | 87 |
| 8 | 4.2 | 50 | 3 days | 83 |
| 9 | 3.7 | 60 | 40 days | 72 |
| 10 | 4.3 | 60 | 3 days | 68 |
| 11 | 4.1 | 30 | 40 days | 75 |
| 12 | — | — | None | 70 |

Nos. 1 to 8 are according to the present invention while the others are comparative.

As is apparent from the results of Table 1, the batteries of the present invention exhibit improved charge-discharge cycle characteristics after stored under the conditions according to the present invention.

While the invention has been described in detail and with reference to specific embodiments thereof, it will be apparent to one skilled in the art that various changes and modifications can be made therein without departing from the spirit and scope thereof.

What is claimed is:

1. A process for preparing a nonaqueous secondary battery comprising a positive electrode sheet containing a lithium-containing transition metal oxide as a positive electrode active material, a negative electrode sheet having at least one layer containing a negative electrode material capable of intercalating and deintercalating lithium, and a nonaqueous electrolyte containing a lithium metal salt, wherein said battery into which an electrolytic solution has been injected is sealed, thereby completing the assembly of the battery, and then subjected to an ageing treatment during a period of time from assembly of the battery to an inspection prior to shipping said ageing treatment comprising two stages of charging treatment and at least two time periods of storage treatment.

2. A process for preparing a nonaqueous secondary battery comprising a positive electrode sheet containing a lithium-containing transition metal oxide as a positive electrode active material, a negative electrode sheet having a metallic material mainly comprising lithium laminated thereon, said negative electrode sheet comprising at least one layer containing a negative electrode material capable of intercalating and deintercalating lithium having thereon at least one auxiliary layer containing an electrically-conductive particle, and a nonaqueous electrolyte containing a lithium metal salt, wherein said battery into which an electrolytic solution has been injected is sealed, thereby completing the assembly of the battery, and then subjected to an ageing treatment during a period of time from assembly of the battery to an inspection prior to shipping, said ageing treatment comprising the following steps in order: (1) a charging treatment at an open-circuit voltage of from 1.5 V to less than 3.8 V, (2) a storage treatment in an environment of from 20° C. to 70 ° C. for from 1 day to 30 days; (3) a charging treatment at an open-circuit voltage of from 3.8 V to 4.3 V and (4) a storage treatment in an environment of from 40° C. to 80° C. for 1 hour to 30 days.

* * * * *